United States Patent [19]

Park

[11] Patent Number: 5,767,645
[45] Date of Patent: Jun. 16, 1998

[54] BACKLASH CORRECTION APPARATUS AND METHOD OF NUMERICAL CONTROLLER

[75] Inventor: Hee Jae Park, Seoul, Rep. of Korea

[73] Assignee: LG Industrial Systems Co., Ltd., Seoul, Rep. of Korea

[21] Appl. No.: 677,958

[22] Filed: Jul. 10, 1996

[30] Foreign Application Priority Data

Jul. 13, 1995 [KR] Rep. of Korea ............... 1995/20583

[51] Int. Cl.⁶ ........................................ G05B 11/01
[52] U.S. Cl. ...................... 318/560; 318/280; 318/600; 318/630; 318/567; 318/568.22; 318/569
[58] Field of Search ........................ 318/560, 280, 318/600, 630, 567, 568.22, 569

[56] References Cited

U.S. PATENT DOCUMENTS

| | | | |
|---|---|---|---|
| 4,961,034 | 10/1990 | Kakino et al. | 318/600 |
| 5,059,881 | 10/1991 | Fujita et al. | |
| 5,343,132 | 8/1994 | Iwashita | 318/630 |

*Primary Examiner*—Karen Masih
*Attorney, Agent, or Firm*—Oliff & Berridge, PLC

[57] ABSTRACT

A backlash correction apparatus and method thereof for a numerical controller, which apparatus includes a command direction memory unit for storing a direction value of a position command, a feedback velocity/direction memory unit for storing a present transfer direction value, a previous direction memory unit for storing a previous transfer direction value, a reverse direction detector for operating on the command direction value, the previous transfer direction value and the present transfer direction and outputting therefrom a correction direction value, a backlash data memory unit for storing a backlash error value corresponding to the pitch position of a ball screw for transferring a table, a correction data operator for reading from the backlash data memory unit backlash errors and outputting therefrom backlash correction values by adding to the read backlash errors the correction direction values, and a correction data output unit for outputting the backlash correction values applied thereto from the correction data operator to a position controller, the apparatus enables enhancing the precision of the position controller by correcting backlash error according to the transfer position value as well as the variation of the command direction value.

6 Claims, 6 Drawing Sheets

| MEMORY ADDRESS | N+1, N+2, N+3, N+4, · · · · |
|---|---|
| BALL SCREW PITCH POSITION | X1, X2, X3, X4, · · · · |
| BACKLASH CORRECTION DATA TO POSITION | B1, B2, B3, B4, · · · · |

BACKLASH CORRECTION APPARATUS AND METHOD OF NUMERICAL CONTROLLER

BACKGROUND OF THE INVENTION

1. Field of the Invention

The present invention relates generally to a numerical controller, and more particularly to a backlash correction apparatus for a numerical controller and a method therefor performing a precise position control by means of exactly correcting backlash errors in the numerical controller according to the location of a transfer screw.

2. Description of the Prior Art

As shown in FIG. 1, a conventional backlash correction apparatus according to U.S. Pat. No. 5,059,881 includes a numerical control instruction generator 103 for interpreting a signal applied thereto from either a tape unit 101 or a keyboard 102 and outputting therefrom a position command signal Xc serving as a command director during a sampling cycle, a position controller 104 for outputting therefrom a velocity command signal Vc in accordance with the position command signal Xc outputted from the numerical control instruction generator 103, a velocity controller 105 for outputting therefrom a torque command signal Tc in accordance with the velocity command signal Vc outputted from the position controller 104, an amplifier 106 for amplifying to a certain level the torque command signal Tc outputted from the velocity controller 105, a motor 107 being powered by a current Ic applied thereto from the amplifier 106, a driving gear 109-1, a driven gear 109-2 and a ball screw 110 each for transferring the table 108 to a certain position by the rotational force of the motor 107, a velocity detector 111 for detecting the rotational velocity of the motor 107 and applying a velocity feedback signal V to the velocity controller 105, a position detector 112 for detecting the position of the motor 107 and applying a position feedback signal X to the position controller 104, a velocity feedback direction memory unit 113 for storing a direction value of the feedback velocity by operating upon the velocity feedback signal V outputted from the velocity detector 111, a command direction memory unit 116 for storing the direction value of the position command signal Xc outputted from the numerical control instruction generator 103, an old direction memory unit 114 for storing, in each cycle, a transfer direction value of the table during a previous cycle, a correction timer 115 for comparing an old direction value stored in the old direction store unit 114 with a present feedback velocity direction value stored in the feedback velocity direction memory unit 113, and a correction data output unit 117 for sending to the position controller 104 a backlash correction data applied thereto from the correction timer 115.

With reference to the accompanying drawings, the operation of the conventional backlash correction apparatus will now be described.

First, the numerical control instruction generator 103 interprets a program recorded on tape unit 101, calculates a transfer amount of the table 108 during a single sampling control cycle, and sends a position command signal Xc to the position controller 104 for servo control.

The position controller 104 operates upon the difference between the position instruction signal Xc outputted from the numerical control instruction unit 103 and the position feedback signal X, obtains a velocity command signal Vc and sends the resulting value to the velocity controller 105. At this time, the position feedback signal X represents a real position value of the table 108 serving as a main object which is controlled by the numerical control apparatus.

The velocity controller 105 obtains the torque command signal Tc by operating upon the difference between the velocity command signal applied thereto from the position controller 104 and the velocity feedback signal V outputted from the velocity detector 111 and sends the torque command signal Tc to the amplifier 106.

The amplifier 106 drives the motor 107 with the current Ic in accordance with the difference between the torque command signal Tc outputted from the velocity controller 105 and a feedback current signal I, thus generating torque in the motor 107.

The torque generated in the motor 107 is converted through the gears 109-1 and 109-2 into shaft operating force which is transmitted to the ball screw 110. As a result, the table 108 is transferred to a certain position in accordance with rotation of the ball screw 110.

When the numerical control instruction unit 103 sends during a sampling cycle the position command signal Xc to the position controller 104 so that the table 108 on the ball screw 110 can be transferred to a certain position, the command direction memory unit 116 replaces at each sampling cycle a stored direction value of the position command Xc with a new direction value, and stores therein the resulting value, which is sent to the correction timer 115.

Also, when the table 108 provided on the ball screw 110 is transferred to a certain position, the position detector 112 detects the present position of the table 108 and applies the position feedback signal X to the position controller 104. Then, the velocity detector 111 detects the transfer velocity of the table 108 and applies the velocity detection signal V to the velocity controller 105. The feedback velocity direction memory unit 113 designates the transfer direction of the table 108, which direction was sensed during a sampling cycle prior to the present sampling cycle, and sends the resulting value to the correction timer 115.

The old direction memory unit 114 replaces a stored transfer direction signal at each cycle with a new direction data and stores therein and sends the resulting value to the correction timer 115.

The correction timer 115 compares the table transfer velocity direction value stored in the old direction memory unit 114 during the previous sampling cycle and the present feedback velocity direction value, and sends to the correction data output unit 117 a backlash correction signal for correcting backlash when the direction value of the present feedback velocity has changed.

Subsequently, when the output unit 117 sends to the position controller 104 the backlash correction signal outputted from the correction timer 115, since the torque command signal Tc becomes compensated by increasing or decreasing in the position controller 104 the value of the position command signal Xc outputted from the numerical control instruction unit 103 to the position controller 104, backlash correction can be obtained.

With reference to FIG. 2, further description of the backlash correction operation occurring in the correction timer 115 will follow.

At a step S1, the correction timer 115 judges the direction of the position command signal Xc read in from the command direction memory unit 116. If the direction value of the position command signal Xc is a value "0", the entire correction operation stops.

If the direction value is judged in step S1 as more than zero, the correction timer 115 judges at step S21 whether the previous direction value stored in the old direction memory unit 114 is plus or minus. At this time, when the previous movement direction value is judged as 'plus', the correction timer 115 terminates every operation. When judged as 'minus', since the transfer direction of the table 108 has changed, the correction timer 115 judges at a next step S31 whether the transfer velocity value of the table 108 is "0" or plus.

If the transfer velocity value is judged 'plus', and is judged to be equal to the direction value of the position command signal Xc or to be "0", the correction timer 115 as in a step S41 sends a 'plus' direction value of the correction data through the correction data output unit 117 to the old direction memory unit. The correction timer 115 in step S5 stores a new previous direction value in the old direction memory unit 114.

Meanwhile, if the command direction value decided in step S1 is minus, the correction timer 115 as in step S22 judges whether the previous direction value stored in the old direction memory unit 114 is 'plus' or 'minus'. At this time, if the previous direction value is judged to be 'minus', the correction timer 115 stops every operation, and, if judged to be 'plus', since the transfer direction value of the table 108 has changed, the correction timer 115 in step S32 judges whether the transfer velocity value of the table 108 is "0" or 'plus'.

When the transfer velocity value is judged to be equal to the present position command value Xc or to be "0", the correction timer 115 in step S42 sends a minus direction correction data through the correction data output unit 117 to the position controller 104. The correction timer 115 in step S5 stores a new previous direction value in the old direction memory unit 114.

Backlash error results from the grooves between threads of the transfer screw and nut, and deflections occur according to the position of the ball screw 110 or each thread thereof.

As the transferring portion of a machine tool wears out, each position of the transfer table generates a different deflection, so that backlash errors at a critically worn-out position become higher.

When the transfer shaft of the machine tool performing the table transfer using the ball screw 110 is measured by a gauge measurement tool, the backlash error of the transfer table 108 is as shown in FIG. 3. Here, the maximum backlash error is set at 20.1 µs.

When backlash correction was performed in accordance with a conventional mean, the backlash errors are as shown in FIG. 4. Here, the maximum backlash error is set at 8.9 µs. The backlash error can be corrected. However, there still remains a large backlash error according to the position of the transfer table 108.

Conventionally, only a single case of backlash correction has been done in each sectional body, without regard to the position of the transfer table or the backlash correction amount variation at each pitch watch section.

Consequently, because the deflection due to the backlash errors in accordance with the ball screw position has not been considered, a precise position control has been difficult to achieve in the conventional art.

Also, since a backlash correction is performed even when the transfer velocity value of the table is "0", position control shaking can be generated in case that the transfer velocity value reaches "0" or a value close to "0".

SUMMARY OF THE INVENTION

Accordingly, it is an object of the present invention to provide a backlash correction apparatus and a method of a numerical controller capable of enhancing the precision of the position controller by performing a backlash correction operation at each position of a ball screw in accordance with variation and transfer position of the transfer position value.

To achieve the above-described object, the apparatus of the present invention comprises a command direction memory means for storing a command direction value of the position command, a feedback velocity/direction memory means for storing a present transfer direction value, a previous direction memory means for storing a previous transfer direction value, a reverse direction detection means for operating on the command direction value, the previous transfer direction and the present transfer direction and outputting therefrom a resultant correction direction value, a backlash data memory means for storing a backlash error value corresponding to a pitch position of the ball screw for transferring the table, a correction data operation means for reading from the backlash data memory means backlash error corresponding to the present position value of the table detected by the position detector and computing and outputting therefrom backlash correction values by adding to the read backlash error the correction direction values applied thereto from the reverse direction detection means, and a correction data output means for outputting the backlash correction values applied thereto from the correction data operation means to the position controller.

Further, a backlash correction method of the present invention includes a first step for determining a command direction value, a second step for judging whether a present transfer direction is positive or zero when the command direction value determined at the first step is positive and a previous transfer direction value is negative, a third step for computing and outputting a correction value after reading a backlash error value corresponding to a present transfer position when the present transfer direction is positive or zero, a fourth step for judging whether a present transfer direction value is negative or zero when the command direction value determined at the first step is negative and the previous transfer direction value is positive, and a fifth step for reading a backlash error value corresponding to the present transfer position, computing and outputting a correction value when the present transfer direction value judged at the fourth step is negative or zero.

DETAILED DESCRIPTION OF THE INVENTION

Figure 1:
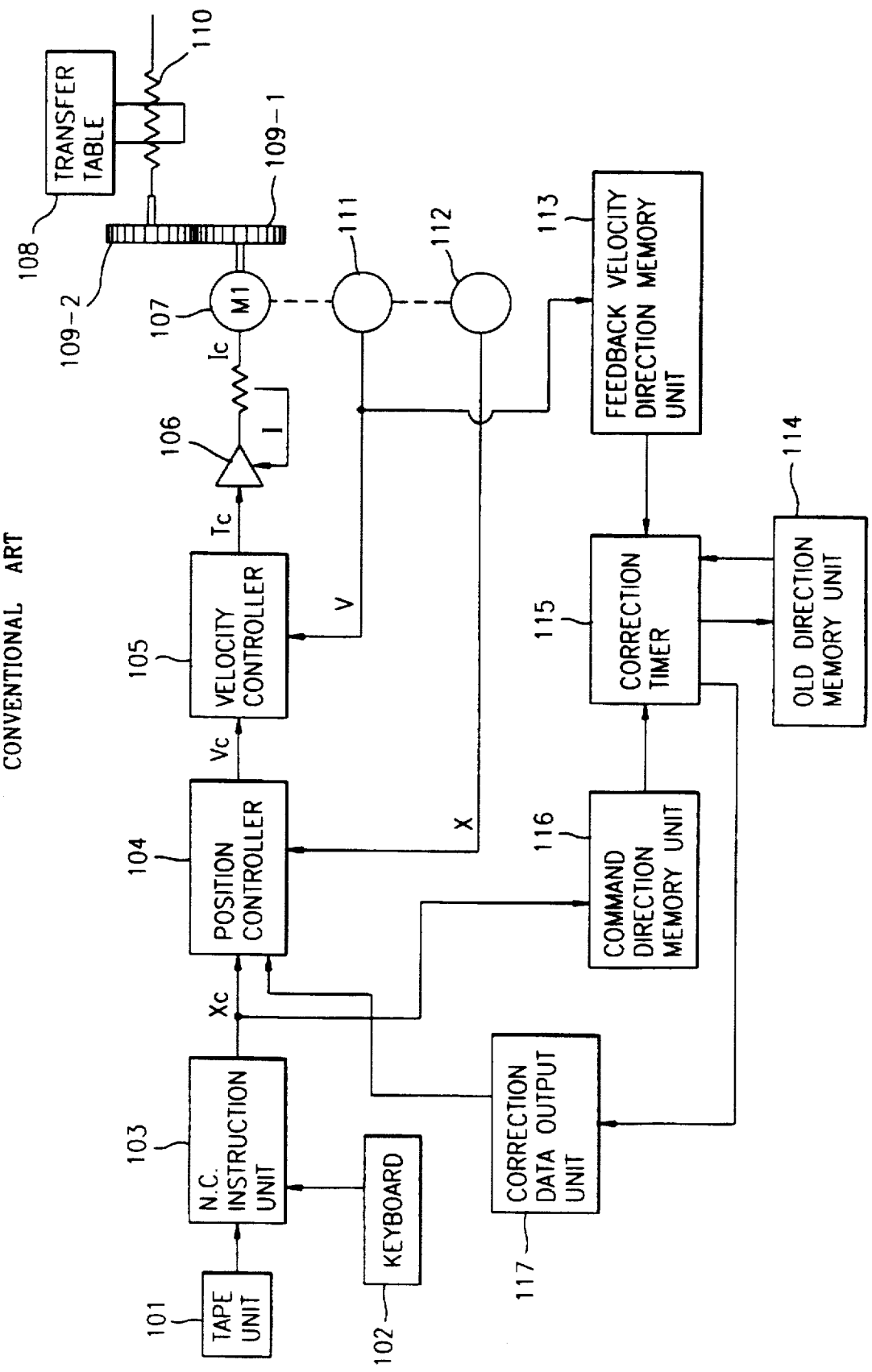
FIG. 1 is a block diagram of a conventional backlash correction apparatus.
Figure 2:
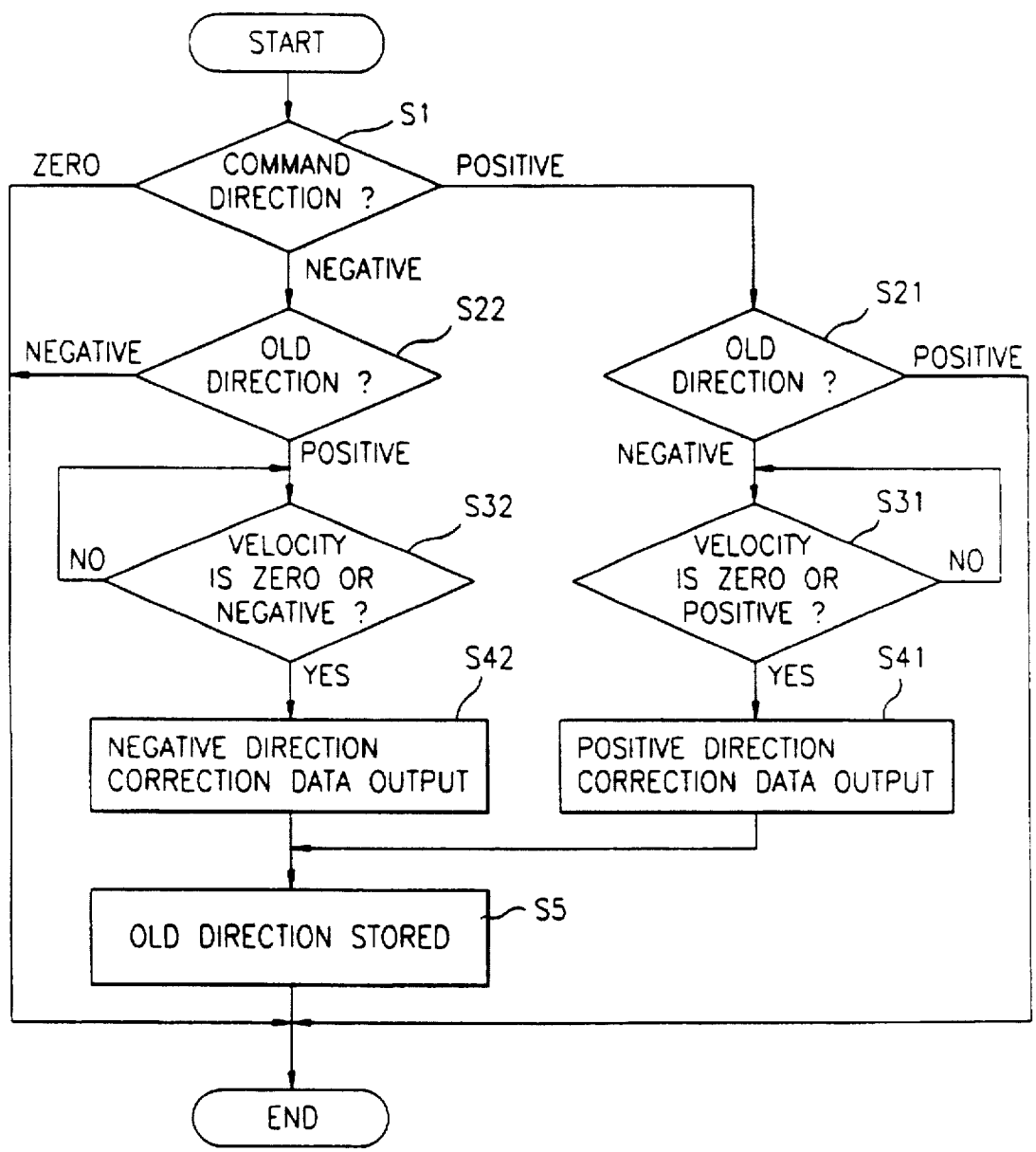
FIG. 2 is a flow chart of the conventional backlash correction operation.
Figure 3:
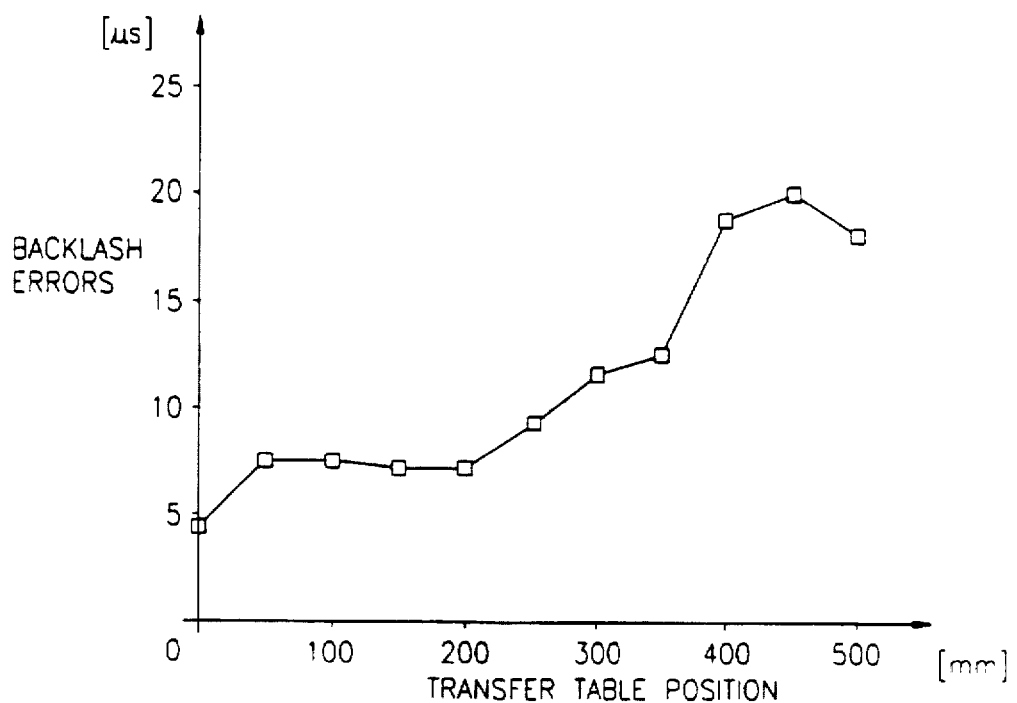
FIG. 3 is a graph showing the backlash error in accordance with the conventional art.
Figure 4:
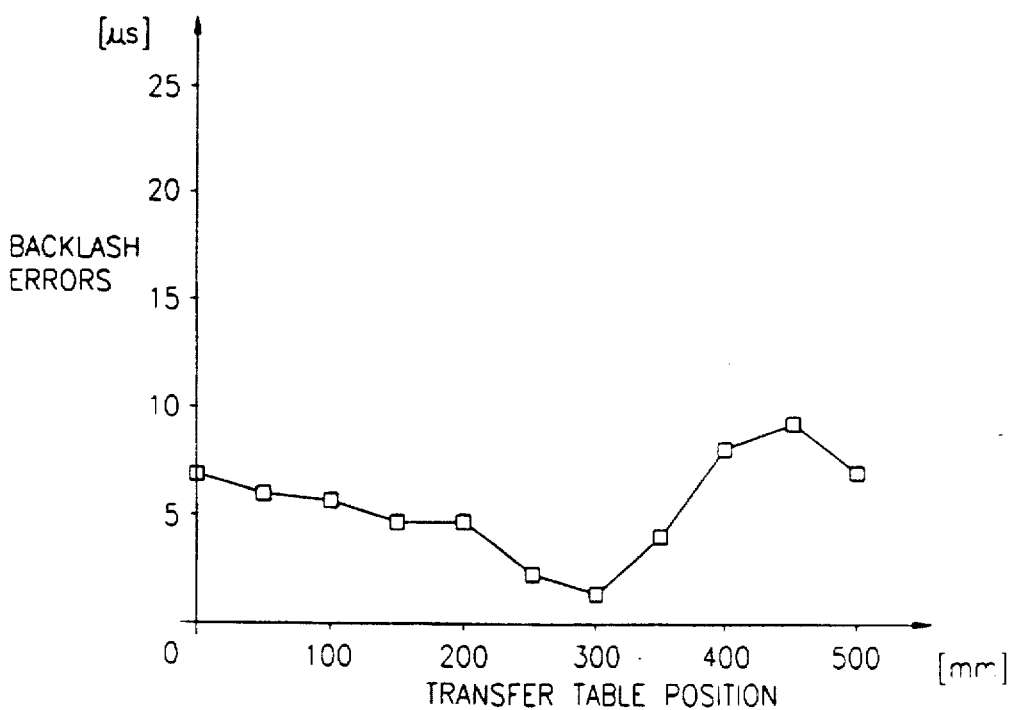
FIG. 4 is a graph of backlash error in accordance with the conventional backlash correction.
Figure 5:
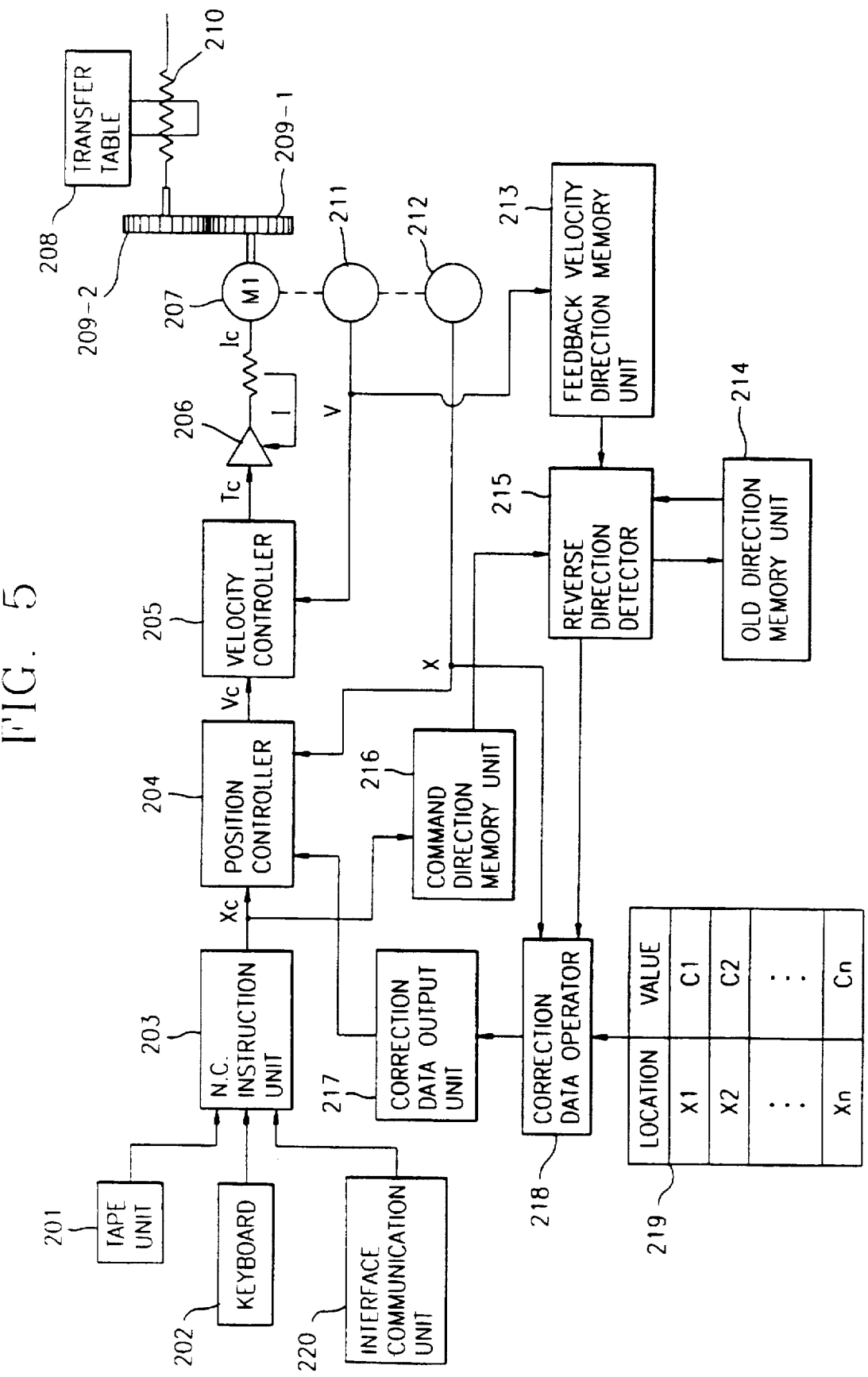
FIG. 5 is a block diagram showing a backlash correction apparatus in accordance with the present invention.

Referring to FIG. 5, the backlash correction apparatus of the present invention includes a numerical control instruction generator 203 for interpreting data applied thereto from any of a tape unit 201, a keyboard 202 or an interface communication unit 220, and outputting therefrom a numerical control command signal Xc, a position controller 204 for outputting a position command signal Vc in accordance with the position command signal Xc outputted from the numerical control instruction unit 203, a velocity controller 205 for outputting a torque command signal Tc in accordance with the command signal Vc outputted from the position controller 204, an amplifier for amplifying to a certain level the torque command signal Tc outputted from the velocity controller 205, a motor 207 being powered by a current Ic applied thereto from the amplifier 206, a driving gear 209-1, a driven gear 209-2 and a ball screw 210 for transferring the table 208 to a certain position by the rotational force of the motor 207, a position detector 212 for detecting the position of the motor 207 and sending a position feedback signal X to the position controller 204, a velocity detector 211 for detecting the rotational velocity of the motor 107 and outputting a velocity feedback signal V, a velocity feedback direction memory unit 213 for storing a present direction value of the feedback velocity in accordance with the velocity feedback signal V outputted from the velocity detector 211, a command direction memory unit 216 for storing the direction value of the position command signal Xc outputted during a sampling cycle from the numerical control instruction generator 203, an old direction memory unit 214 for storing, in each cycle, a transfer direction value of a table during a previous cycle, a reverse direction detector 215 for comparing an old direction value stored in the old direction memory unit 214, an instruction direction value stored in the instruction direction memory unit 216 and a present velocity feedback direction value stored in the velocity feedback direction memory unit 213 and for detecting if any of the direction values have changed, a backlash data memory unit 219 for storing backlash error data, which corresponds to a pitch position of the ball screw 210, a correction data operator 218 for, when a plus or minus reverse direction value is detected in the reverse direction detector 215, receiving a present position value of the motor 207 from the position detector 212, reading an error value indicating the present position of the motor 207 and stored in the backlash data memory unit 219, and outputting backlash correction data by adding thereto an output code from the reverse direction detector 215, and a correction data output unit 217 for feeding back to the position controller 204 the data outputted from the correction data operator 218.

The operation and effect of the thusly composed apparatus of the present invention will now be described in detail.

Initially, the numerical control instruction unit 203 which has received control program data from any of the tape unit 201, the keyboard 202 or the interface communication unit 220 performs a servo control, by computing the transfer amount of the table 208 during a single sampling cycle and transmitting the resulting position command signal Xc to the position controller 204.

The position controller 204 operates upon the difference between the position command signal Xc applied thereto from the numerical control instruction unit 203 and the feedback position signal X received from the position detector 212, yields the velocity command value Vc and outputs therefrom the yielded velocity command value Vc to the velocity controller 205. At this time, the feedback position signal X denotes a real position of the table 208, and the position detector 212 can cooperate with the motor 207 or be mounted on the transfer shaft of the table 208.

The velocity controller 205 operates upon the difference between the velocity command signal Vc outputted from the position controller 204 and the feedback velocity signal V outputted from the velocity detector 211 so as to compute the torque command signal Tc, and outputs the computed torque command signal Tc to the amplifier 206.

Then, the amplifier 206 amplifies the torque command signal Tc outputted from the velocity controller 205, operates upon the difference between the amplified torque command signal and a current feedback signal I and outputs the current Ic to the motor 207, whereby the motor 207 generates torque according to the current Ic. The thusly generated torque is converted via the gears 209-1, 209-2 so as to rotate the transfer screw 210, and accordingly transfers the table 208 to a certain position on the transfer screw 210.

To cause the transfer table 208 to be transferred to a precise position on the ball screw 210, when the numerical control instruction unit 203 sends the position command signal Xc to the position controller 204, the command direction memory unit 216 replaces the direction value of the position command signal Xc by a new command direction data in every sampling cycle, and stores therein and outputs therefrom the data to the reverse direction detector 215.

When the transfer table 208 is transferred to a certain position on the ball screw 210, the position detector 212 detects the present position of the transfer table 208, and transfers to the position controller 204 the present position value. The velocity detector 211 detects the rotation velocity value of the motor 207, which value serves as the transfer velocity value of the transfer table 208, and outputs the feedback velocity signal V to the velocity controller 205. The feedback velocity direction memory unit 213 stores therein a direction value of the feed back velocity signal V and outputs same to the reverse direction detector 215.

The old direction memory unit 214 replaces the direction value of the table 208 by a new direction data at each cycle and sends the value to the reverse direction detector 215.

To correct backlash errors occurring due to the reversing of the transfer direction of the table 208, the reverse direction detector 215 operates upon the command direction value from the command direction memory unit 216, the previous direction value from the old direction memory unit 214 and the present transfer velocity value from the feedback velocity direction memory unit 213 and sends an appropriate backlash direction value to the correction data operator 218.

The correction data operator 218 receives from the reverse direction detector 215 data on the direction value of backlash correction, from the position detector 212 the present position data of the transfer table 208, reads from the correction data memory unit 219 backlash correction data corresponding to the position data, and yields the corrected values by adding to the backlash correction data the value in accordance with the correction direction value.

The backlash data memory unit 219 serving as a memory device stores in an array the backlash correction data corresponding to the portion of the table 208.

Subsequently, the correction data output unit 217 sends to the position controller 204 the backlash correction value outputted from the correction data operator 218. The position controller 204 increases or decreases the position command signal Xc outputted from the numerical control instruction unit 203 in accordance with the transferred backlash correction value. Therefore, the torque command signal Tc outputted from the velocity controller 205 is corrected, resulting in the correction of the backlash error.

Figure 6:
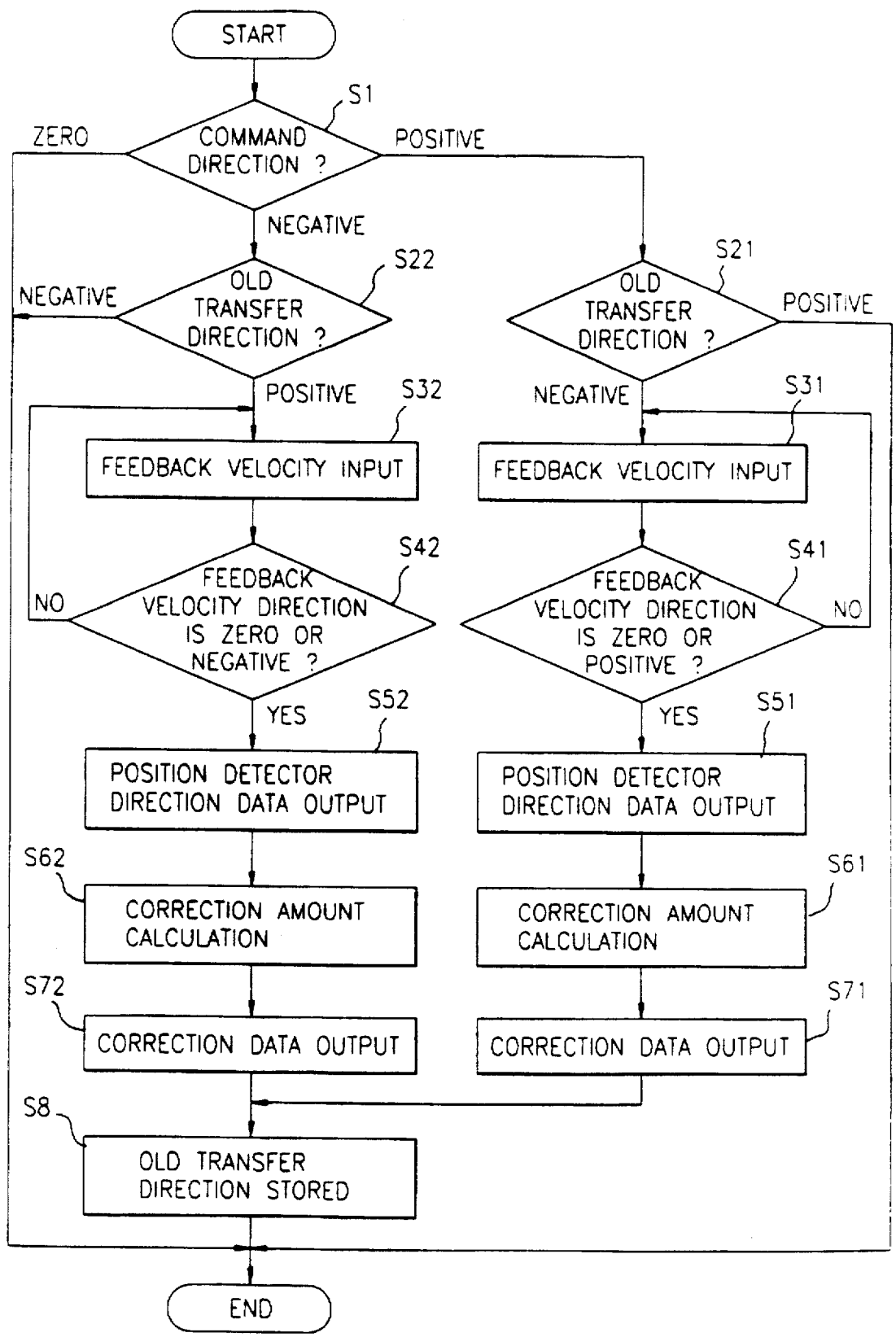
FIG. 6 is a flow chart showing the backlash correction method of the present invention.

With reference to FIG. 6, the correction process for the backlash errors will be described.

Initially, in step S1, the reverse direction detector 215 determines the direction value of the position command signal Xc by reading data stored in the command direction memory unit 216. If the direction value of the command signal Xc is more than zero, the direction detector 215 judges in a step S21 whether the old direction value is positive or negative in accordance with the data read from the old direction memory unit 214. At this moment, if the old direction value remains positive, the correction operation terminates, and if negative, the reverse direction detector 215 reads from the feedback velocity direction memory unit 213 the transfer velocity direction data of the table 208 in step S31. At step S41, it is judged whether the transfer velocity direction value of the table 208 is positive or zero.

When the transfer direction value is negative, the reverse direction detector 215 continues reading the data from the feedback velocity direction memory unit 213, and when zero or positive, the detector 215 sends in step S51 the direction data to the correction data operator 218.

Thereafter, according to the direction data applied thereto, the correction data operator 218 in a step S61 reads from the backlash data memory unit 219 the backlash correction values corresponding to the transfer position value detected in the position detector 212 and computes the correction amount, thus outputting therefrom the computed correction data to the correction data output unit 217.

In step S71, the correction data output unit 217 sends to the position controller 204 the backlash correction data applied thereto from the correction data operator 218, and accordingly the backlash error of the transfer table 208 is corrected.

The reverse direction detector 215 makes the old transfer direction value positive and stores the resulting value in the old direction memory unit 214, thus completing the backlash error correction operation.

Meanwhile, if the direction value of the position command signal Xc is judged negative, the reverse direction detector 215 reads the data from the old direction memory unit 214 in step S22 and judges whether the old direction is positive or negative.

At this time, when the previous direction value is negative, the correction operation terminates, and when positive, the detector 215 in step S22 reads from the velocity feedback memory unit 213 the transfer velocity direction data of the table 208. In step S42, the detector 215 judges whether the transfer direction value of the table 208 is negative or zero.

So, when the transfer direction value is positive, the detector 215 repeats reading the direction data of the feedback velocity direction memory unit 213, and when zero or negative, the direction data is outputted therefrom to the correction data operator 218 in step S52.

In step S62, the correction data operator 218 receives correction direction data from the reverse direction detector 215, and transfer position value of the table 208 from the position detector 212, respectively, and computes the correction amount after reading from the backlash data memory unit 219 the correction value corresponding to the transfer position.

Then, in step S72, the correction data output unit 217 sends to the position controller 204 the backlash correction data applied thereto from the correction data operator 218, whereby the backlash error of the table 208 is corrected. The reverse direction detector 215 in step S8 makes negative and stores in the memory unit 214 the old transfer direction value, thereby completing the backlash error correction operation.

There are various operational algorithms which may be employed in the correction data operator 218 to perform backlash correction in accordance with pitch position, such as computing a correction amount at a leading point adjacent to the present position of the pitch, and calculating backlash amount by means of linear interpolation.

For a method for computing correction amount by means of a leading point, a pair of pitch positions $X_m$, $X_{m+1}$ adjacent to left and right sides of a pitch position Xn serving as the transfer position of the table 208 are first located. A correction amount corresponding to each of the pitch positions $X_m$, $X_{m+1}$ is obtained from the correction data memory unit 219. The obtained values are assigned as $B_m$, $B_{m+1}$, respectively.

Next, a distance $D_m$ between a pitch position $X_n$ and another pitch position $X_{m+1}$ on its left, and another distance $D_{m+1}$ between pitch position Xn and another position on its right are then calculated.

If $D_m$ is less than $D_{m+1}$, compared with the inter-pitch distances $D_m$, $D_{m+1}$, the backlash amount $B_m$ at the pitch position $X_m$ is produced at the pitch position $X_n$, and if $D_m$ is not less than $D_{m+1}$, the correction amount $B_{m+1}$ at the pitch position $X_{m+1}$ is obtained at the pitch position $X_n$.

The correction data operator 218 sends via the correction data output unit 217 to the position controller 204 the correction value at the pitch position $X_n$.

For a correction amount computing method using linear interpolation, a pair of pitch positions $X_m$, $X_{m+1}$ adjacent to left and right sides of the pitch position $X_n$ are located and the correction amount corresponding to each of the pitch positions $X_m$, $X_{m+1}$ is read from the backlash data memory unit 219.

Therefore, in case the pair of correction amounts corresponding to each of the pitch positions $X_m$, $X_{m+1}$ are assigned as $B_m$ and $B_{m+1}$, the correction amount $B_m$ at the pitch position $X_n$ can be obtained as follows.

$$B_n = B_m + (B_{m+1} - B_m)(X - X_m)/(X_{m+1} - X_m)$$

The backlash error correction amount corresponding to the pitch position is precisely measured using a linear variation measurement device, such as a gauge instrument, and the backlash amount of the measured backlash errors is stored in the backlash data memory unit 219 which is composed of an electronic memory.

Figures 7, 8:
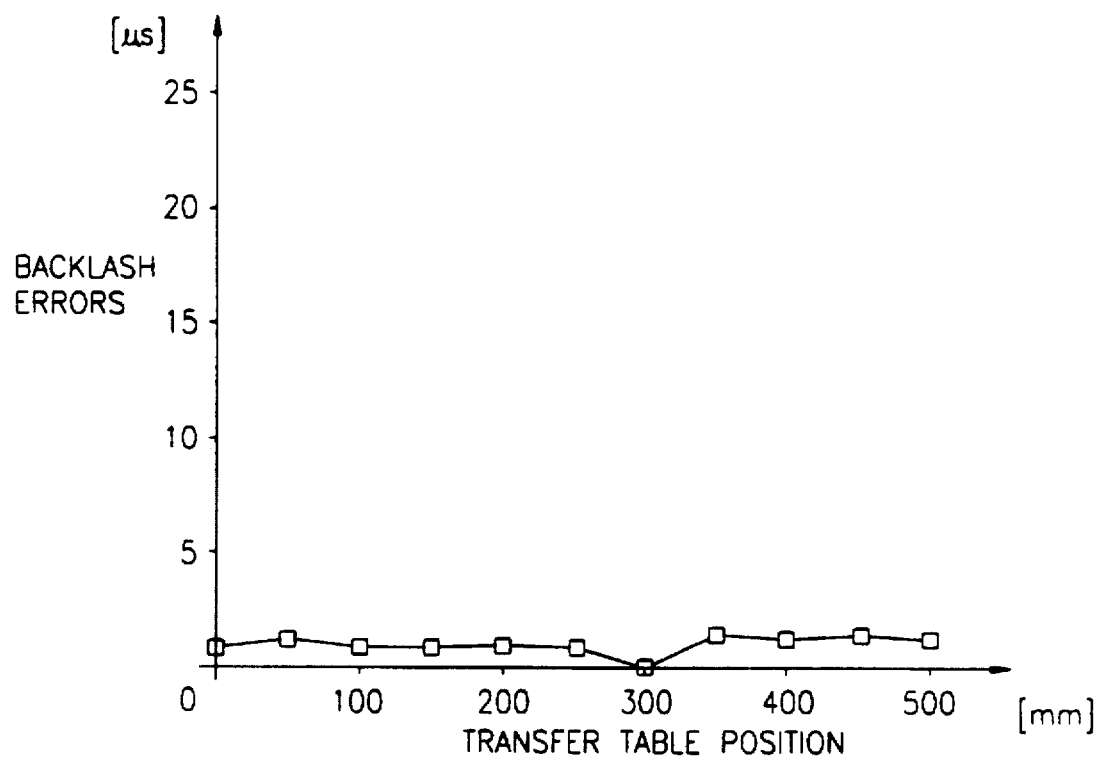
FIG. 7 is a graph showing the backlash correction of the present invention.
FIG. 8 is a data array view of a correction data memory unit in FIG. 5.

In case a backlash correction data corresponding to a screw pitch position, such as $X_1$, $X_2$, $X_3$, $X_4$, . . . , denotes $B_1$, $B_2$, $B_3$, $B_4$, . . . , respectively, when a memory address becomes stored subsequently therein from the address N+1, the data stored in the backlash data memory unit 219 is arrayed as shown in FIG. 8.

When the backlash errors are corrected using the present invention, since the backlash error as shown in FIG. 7 is 1.0 µs, only a relatively small amount of backlash error remains.

Therefore, the present invention enables improving the backlash error correction effect for a precise position control.

As described above, the present invention has an advantage, in that the precision of a position control can be enhanced by correcting backlash errors in accordance with determining the backlash correction amount by taking into account the transfer position as well as the variation of the command direction value.

What is claimed is:

1. A backlash correction apparatus of a numerical controller of a ball screw-transferred table characterized in that, a position controller sends to a velocity controller a velocity command signal in accordance with a position command signal, and accordingly when the table is transferred to a certain position, a position detector and a velocity detector detect and feed back to the position controller and the velocity controller a present position value and the transfer velocity value, respectively, comprising:

- a command direction memory means for storing a command direction value of the position command;
- a feedback velocity/direction memory means for storing a present transfer direction value;
- a previous direction memory means for storing a previous transfer direction value;
- a reverse direction detection means for operating on the command direction value, the previous transfer direction and the present transfer direction and outputting therefrom a resultant correction direction value;
- a backlash data memory means for storing a backlash error value corresponding to a pitch position of the ball screw for transferring the table;
- a correction data operation means for reading from the backlash data memory means backlash error corresponding to the present position value of the table detected by the position detector and computing and outputting therefrom backlash correction values by adding to the read backlash error the correction direction values applied thereto from the reverse direction detection means; and
- a correction data output means for outputting the backlash correction values applied thereto from the correction data operation means to the position controller.

2. The apparatus of claim 1, wherein said backlash data memory means is a memory device for storing backlash error values corresponding to the pitch value of the ball transfer screw.

3. The apparatus of claim 1, wherein said correction data operation means receives from the position detector a present position value of the table when an output value of the reverse direction detection means is positive or negative.

4. The apparatus of claim 1, wherein when the command direction value is positive, the previous direction value is negative, and the transfer velocity direction value is zero or positive, said reverse direction detection means outputs therefrom a positive correction direction data, and when the command direction value is negative, the previous direction value is positive and the transfer velocity direction value is zero or negative, said reverse direction detection means outputs therefrom a negative correction direction data.

5. A backlash correction method, comprising:

- a first step for determining a command direction value;
- a second step for judging whether a present transfer direction is positive or zero when the command direction value determined at the first step is positive and a previous transfer direction value is negative;
- a third step for computing and outputting a correction value after reading a backlash error value corresponding to a present transfer position when the present transfer direction is positive or zero;
- a fourth step for determining whether a present transfer direction value is negative or zero when the command direction value determined at the first step is negative and the previous transfer direction value is positive; and
- a fifth step for reading a backlash error value corresponding to the present transfer position, computing and outputting a correction value when the present transfer direction value judged at the fourth step is negative or zero.

6. The method of claim 5, further comprising storing a renewed previous transfer direction value serving as a present transfer direction value.

* * * * *